(12) United States Patent
Sakai (10) Patent No.: US 9,494,219 B2
(45) Date of Patent: Nov. 15, 2016

(54) SMALL OPENING/CLOSING SLIDER

(71) Applicant: NIPPON THOMPSON CO., LTD., Tokyo (JP)

(72) Inventor: Tetsuya Sakai, Gifu-ken (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 53 days.

(21) Appl. No.: 14/669,441

(22) Filed: Mar. 26, 2015

(65) Prior Publication Data

US 2015/0308548 A1 Oct. 29, 2015

(30) Foreign Application Priority Data

Apr. 23, 2014 (JP) .................... 2014-088794

(51) Int. Cl.
| | |
|---|---|
| *F16H 25/20* | (2006.01) |
| *F16H 25/22* | (2006.01) |
| *F16H 25/24* | (2006.01) |
| *B23B 31/19* | (2006.01) |

(52) U.S. Cl.
CPC ............ *F16H 25/20* (2013.01); *B23B 31/19* (2013.01); *F16H 25/2006* (2013.01); *F16H 25/2204* (2013.01); *F16H 2025/204* (2013.01); *F16H 2025/2059* (2013.01)

(58) Field of Classification Search
CPC ............ F16H 25/20; F16H 25/2204; F16H 2025/204; F16H 25/2006; F16H 2025/2059; B23B 31/19; Y10T 74/18632; Y10T 74/18576
USPC .................... 74/89.23, 89.3, 89.35
See application file for complete search history.

(56) References Cited

U.S. PATENT DOCUMENTS

| | | | | |
|---|---|---|---|---|
| 2,019,659 | A * | 11/1935 | Curtis ................. | E21B 19/081 74/110 |
| 2,247,562 | A * | 7/1941 | Santen ................. | F16D 65/14 292/259 A |
| 2,340,029 | A * | 1/1944 | Weingartner .......... | B23G 3/04 74/89.23 |
| 3,482,463 | A * | 12/1969 | Eduard ................ | B30B 1/23 100/289 |
| 3,630,328 | A * | 12/1971 | Nelson ................ | B64C 13/00 192/223 |
| 4,509,379 | A * | 4/1985 | Westmoreland ........ | F16D 7/022 192/26 |

(Continued)

FOREIGN PATENT DOCUMENTS

| | | | |
|---|---|---|---|
| FR | 2642143 A1 * | 7/1990 | ............ B60S 5/043 |
| JP | 5047749 B2 | 10/2012 | |

*Primary Examiner* — David M Fenstermacher
*Assistant Examiner* — Randell J Krug
(74) *Attorney, Agent, or Firm* — Browdy and Neimark, PLLC (57) ABSTRACT

Tables having nuts are easily assembled and/or replaced on a lead screw from an open side thereof. The lead screw has a large screw near a motor and a small screw remote from the motor. A right-handed screw mating with one of the nuts and a left-handed screw mating with the other of the nuts lie adjacent to each other in the lengthwise direction. A stepped portion of flange coming into an inner ring of a bearing is placed on an end shaft in adjacency to the large screw. The pair of the tables after energization of the motor is controlled to come to a preselected phase in which the tables get closer or nearer each other or come to another preselected phase in which the tables go away from each other.

9 Claims, 7 Drawing Sheets

(56) References Cited

U.S. PATENT DOCUMENTS

| | | | | |
|---|---|---|---|---|
| 5,203,222 A | * | 4/1993 | Hirai | F16H 25/2018 74/665 A |
| 5,647,245 A | * | 7/1997 | Takei | F16H 25/2018 74/89.3 |
| 6,240,796 B1 | * | 6/2001 | Yamada | B23Q 1/0063 74/89.23 |
| 7,963,529 B2 | * | 6/2011 | Oteman | B60G 13/001 188/266 |
| 2004/0187621 A1 | * | 9/2004 | Hamann | B23Q 5/40 74/424.76 |
| 2006/0036248 A1 | * | 2/2006 | Ferrante | A61B 17/7225 606/64 |
| 2008/0014047 A1 | * | 1/2008 | Dohi | F16B 25/0031 411/387.4 |
| 2008/0041181 A1 | * | 2/2008 | Mueller | F16H 61/32 74/473.12 |
| 2009/0092344 A1 | * | 4/2009 | Sakai | F16C 23/086 384/45 |
| 2009/0183586 A1 | * | 7/2009 | Horibe | F16C 29/00 74/89.33 |
| 2010/0139426 A1 | * | 6/2010 | Mori | F16C 29/004 74/89.32 |
| 2010/0269604 A1 | * | 10/2010 | Fujiwara | B23P 19/042 74/89.39 |
| 2012/0285278 A1 | * | 11/2012 | Sakai | F16H 25/2204 74/89.33 |
| 2013/0160585 A1 | * | 6/2013 | Schroeder | F16H 25/08 74/89.42 |

* cited by examiner

SMALL OPENING/CLOSING SLIDER

FIELD OF THE INVENTION

The present invention relates to a small-sized sliding device which is operative to open and/or close chucks and so on applicable to micromachines, small-sized machine tools, various assembling machines, semiconductor fabricating equipments, testing/inspection instruments, and so on.

BACKGROUND OF THE INVENTION

Sliding devices are already known which use sliding screws to open and/or close chucks and so on. The sliding screw is conventionally needed to make smaller in the outside diameter at an axial end thereof than in the major zone of the sliding screw to mate with a nut. With the prior sliding devices constructed as stated earlier, the angular-contact bearings are thrust directly with the coupling ends. A separate collar is used around the outside diameter of the axial end of the sliding screw to fasten the angular bearing. Conventionally, there has been an issue that the collar and the end of the angular-contact bearing slide each other after the torque of the motor have become large. Moreover, there is known another type of the sliding device in which a collar integral with a flange is used after a nut is mated with the lead screw. The sliding device of the type as recited just earlier has been troublesome because press-fitting, adhesion and so on have been needed for fixing. With the sliding device of the type as recited just earlier, the lead screw at the axial end thereof has to be also made less in outside diameter as in the former sliding device to mate with a nut. With the prior sliding devices constructed as described earlier, thus, it is needed to select a unique angular-contact bearing less in inside diameter for supporting rotation. Moreover, the coupling end is to be made the size or dimension different from the diameter of the motor shaft. Thus, the prior sliding devices constructed as described earlier, as making it tough to use any universal parts or components, requires producing unique parts. This will cause a serious issue of increase of production cost.

One version of the prior small-sized sliding devices made further smaller in lengthwise direction is disclosed in the commonly assigned Japanese Patent No. 5 047 749, in which a motor is actuated to rotate a lead screw to move a slide table in an axial direction of a guide rail. The lead screw has chucks and a bearing is interposed between the chucks and a coupling member. With the sliding device constructed as stated earlier, there is no use of bearing nut, but a collar integral with a stepped flange is made integral with the lead screw. Nevertheless, the sliding device constructed as recited just earlier has been troublesome because adhesion on top of press-fitting has been needed for fixing.

With the sliding device constructed as recited just earlier, the coupling member instead of using the bearing nut to fix the angular-contact bearing is directly assembled to make less the overall length of the table. It will be said that the nut incorporated in the table is only a linear motion guide unit, namely a single type. Then, a small-sized sliding device has been proposed in which a pair of sliders or tables is mounted on a lead screw for sliding movement along the lead screw in such a way coming closer and/or away from each other to transfer any part or component while gripping the part between the tables.

SUMMARY OF THE INVENTION

The present invention, therefore, has as its primary object to provide a small-sized sliding device most available for a variety of machines including semiconductor fabricating equipments, assembling machines, testing/inspection instruments, and so on. More particularly, the small-sized sliding device has a pair of tables provided for back-and-forth movement along the lengthwise direction of the bed through the linear motion guide units. The tables have the chucks and so on, which operate with accuracy to close and/or open each other to grip or grasp the small parts or works at a supply station and release them at an assembling site. With the small-sized sliding device constructed as stated earlier, each of a pair of the tables has a counterpart of the gripper members including the fingers, chucks and so on. The gripper members lying opposite to each other may be in closed phase to hold anything between the gripper members after the gripper members have come closer each other by energization of the motor. On the contrary, the gripper members after the tables having away from each other come to opened phase to release anything held between the gripper members.

Subject to be Solved with the Present Invention

The present invention is concerned with a small-sized opening/closing slider; comprising an elongated having a mounting surface of a rectangular shape in a plane surface, a pair of tables allowed to move in a sliding manner lengthwise of the bed through a linear motion guide unit, the tables each having a top surface to mount a work thereon, a lead screw supported for rotation on the bed to extend in a lengthwise direction of the bed, the screw being mated with nuts fastened to the tables, a bearing house fastened to the bed to bear an axial end of the lead screw through a bearing, and a motor driving the lead screw through a coupling member which connects an output shaft of the motor and a terminal end of the axial end of the lead screw;

wherein the lead screw has screw larger in diameter near the motor and a screw smaller in diameter axially opposed to the motor, the lead screw having a right-handed threads mating with one of the nuts and a left-handed threads mating with other nut, the right-handed threads and the left-handed threads lying adjacent to each other in the lengthwise direction of the lead screw, and wherein a stepped portion or flange at an axial end thereof coming into abutment or engagement with an inner ring of the bearing is formed on the axial end of the lead screw continuing to a zone having the larger threads, whereby the pair of the tables after energization of the motor is controlled to come to a preselected phase in which the tables get closer or nearer each other or come to another preselected phase in which the tables go away from each other.

The nut is installed in a bore axially extending the table and fastened to the table through a mounting part which is set on an end surface of the nut, and the nut mating with the screw larger in diameter is formed to extend through the screw smaller in diameter. Moreover, the lead screw has the zone of the right-handed or left-handed screw larger in diameter and other zone of the right-handed or left-handed screw smaller in diameter, the larger screw and the smaller screw being equal in pitch with each other.

The bearing supporting the lead screw is composed of a pair of angular-contact bearings, which is set in place and fastened to the lead screw by means of the stepped portion or flange and the coupling member. Moreover, the flange on the lead screw is larger in diameter than the screw larger in diameter and the nut having fastened the larger screw is controlled on the lead screw.

The lead screw is supported with the bearing, the inner ring of the bearing being interposed between the end surface of the stepped portion or the flange and the end surface of the coupling member. Moreover, the lead screw is either of a sliding screw version and a ball screw version the pair of nuts mates with the lead screw through balls. In addition, the lead screw at minimum of the ball screw version has the large screw of substantially 6 mm in outside diameter and the small screw of substantially 4 mm in outside diameter.

The linear motion guide units to slide the pair of the tables is shrouded with a covering member to extrude dust and dirt, and the covering member has lugs and correspondingly the bed has a recess lying on an end opposite to the motor and the bearing house on sidewise opposite sides thereof has recesses, so that the recesses snap-fit over or make snap-engagement with the lugs on the covering member to fasten the covering member to the bed.

Effect of the Invention

With the small-sized opening/closing slider constructed as stated earlier, the nuts fastened to the tables, respectively, are easily assembled and/or replaced on the lead screw from an open side of the lead screw. The slider of the present invention may be miniaturized as small as possible regardless of the posture of the slider. After the bearing house stowing therein the bearing to support the lead screw has been installed on the bed, the lead screw having the stepped portion or flange is born against the bearing in such a relation that the stepped portion or flange come into abutment against the bearing, and the pair of nuts is mated with the lead screw. More especially, there is first assembled the table having the nut mated with the large screw of the lead screw, and then another table having the nut mated with the small screw of the lead screw. Thereafter, the lead screw is firmly born against the lead screw by means of the stepped portion or flange made on the lead screw. Thus, the slider of the present invention may be dismantled and/or assembled or maintained with ease. With the small-sized opening/closing slider constructed as stated earlier, as the lead screw is born against the bed through a pair of angular-contact bearings, the lead screw is firmly mounted to the bed with steadiness and a pair of the table is allowed to make the back-and-forth movement with steadiness and accuracy.

DETAILED DESCRIPTION OF THE PREFERRED EMBODIMENTS

A preferred embodiment of the small-sized opening/closing slider constructed according to the present invention will be explained in detail with reference to the accompanying drawings. The small-sized opening/closing slider of the present invention is suited for use as actuators in machinery as diverse as semiconductor manufacturing machines, assembly machines, measuring/inspection instruments, testing instruments, machine tools, and so on. More especially, the small-sized opening/closing slider of the present invention is designed to be easy to use or handle because movable tables 3, 4 serving as actuators may be selected in stroke length.

Figure 1:
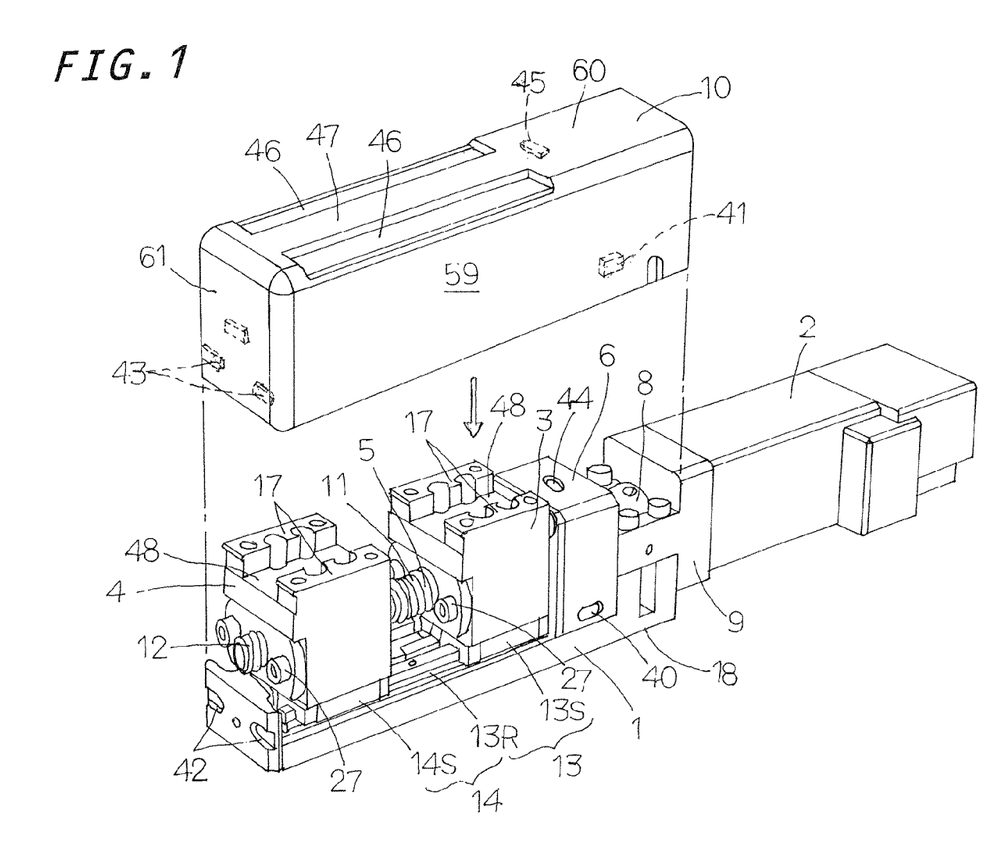
FIG. 1 is a view in perspective showing a preferred embodiment of a small-sized opening/closing slider according to the present invention, in which a main body is dismantled of a covering member and cords or lines including a sensor cord, motor cord, resolver cord and so on are shown removed.
Figure 2:
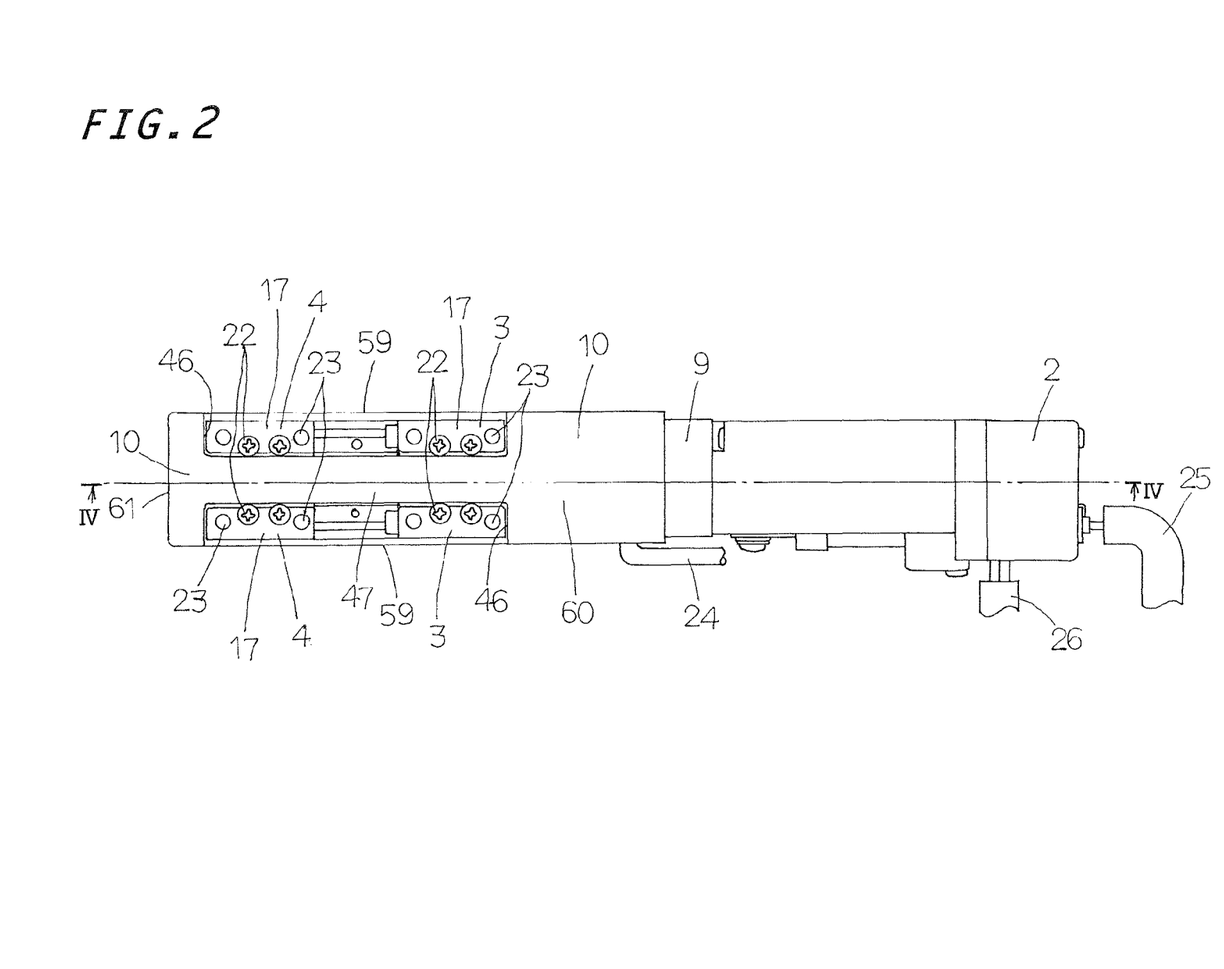
FIG. 2 is a plan view of the small-sized opening/closing slider of the present invention.
Figure 3:
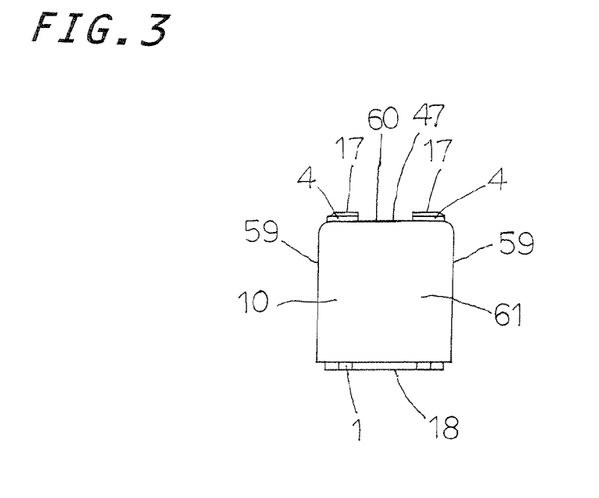
FIG. 3 is a view in side elevation of the small-sized opening/closing slider of FIG. 2.
Figure 4:
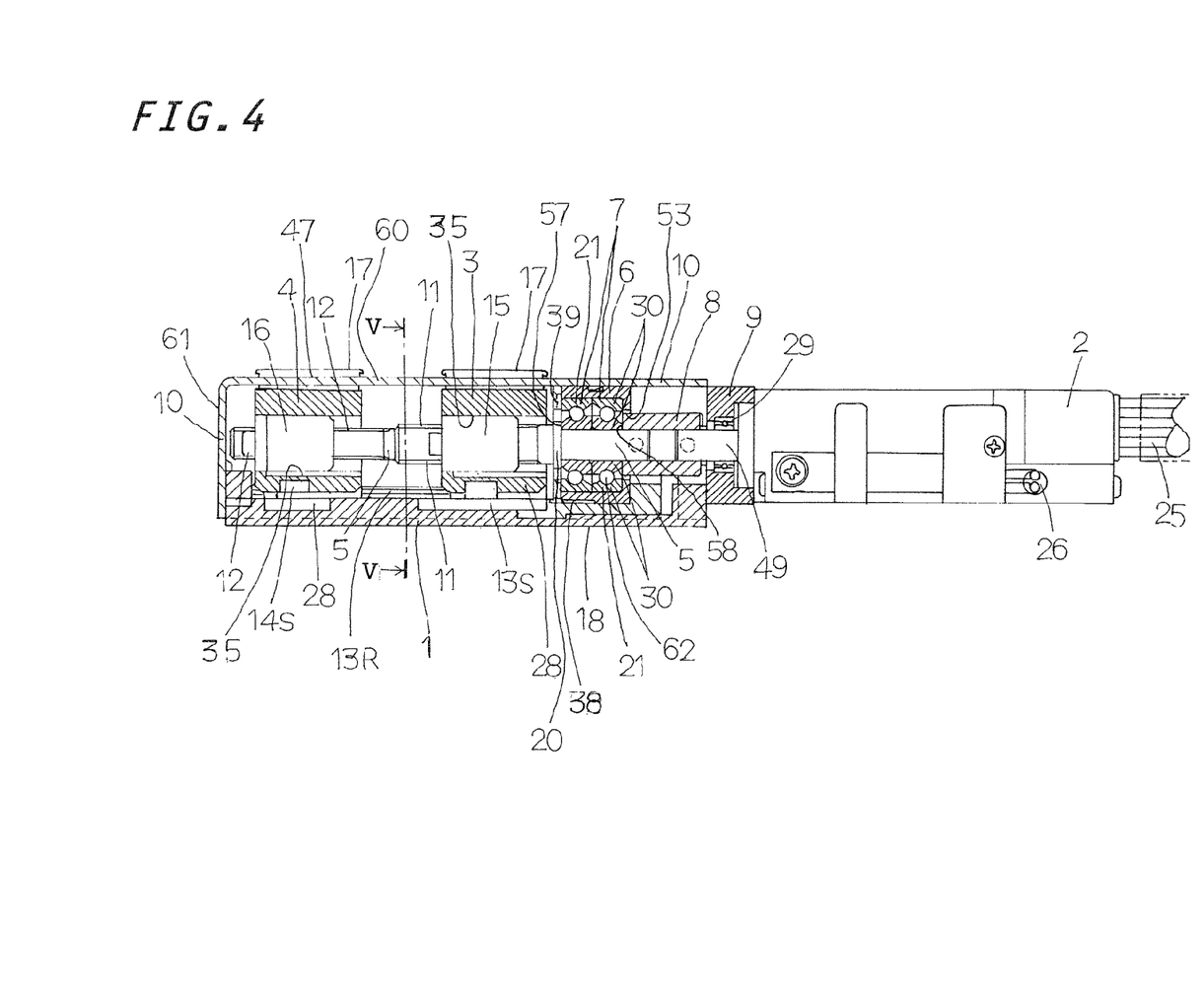
FIG. 4 is a view in transverse section of the small-sized opening/closing slider, the view being taken along the plane of the line IV-IV of FIG. 2.
Figure 5:
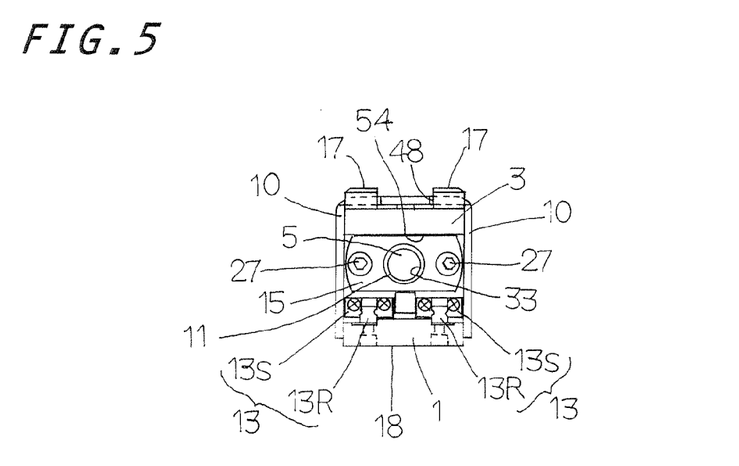
FIG. 5 is a view in transverse section of the small-sized opening/closing slider, the view being taken along the plane of the line V-V of FIG. 4.
Figure 6:
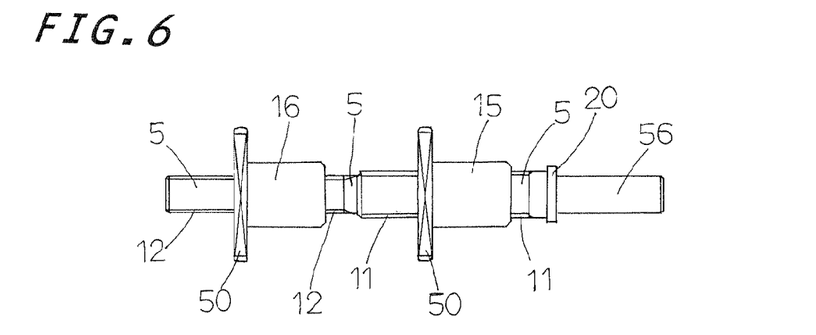
FIG. 6 is a view in front elevation showing nuts and a lead screw fit in the nuts to be assembled into the small-sized opening/closing slider of the present invention.
Figure 7:
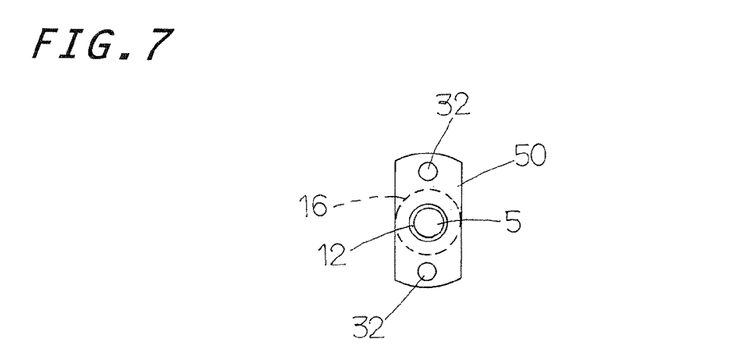
FIG. 7 is a view in side elevation of the lead screw and the nuts fitted over the lead screw of FIG. 6.

The small-sized opening/closing slider constructed according to the present invention in general as shown in FIGS. 1 to 4 has an elongated bed 1 having a mounting surface 18 of rectangular shape, a pair of tables 3, 4 allowed to slide or move in a longitudinal direction of the bed 1 through linear motion guide units 13, 14, a lead screw 5 extending in lengthwise direction to mate with a nut 15 secured to the table 3 and a nut 16 secured to the table 4, a bearing house 6 fastened to the bed 1 to bear one of screw ends 56 of the lead screw 5 through bearings 7 which are installed inside a recess 38 in the bearing house, a coupling member 8 connecting a motor shaft with a terminal of a shaft end 56 extended through the bearings 7, and motors 2 such as a microscopic AC servomotor, stepping motor, DC motor and so on. The bed 1 has threaded holes 35 used to fasten the bed 1 to the machine base. The tables 3, 4 have bores 35 to fit over the nuts 15, 16. The nut 15 fit into the threaded hole 35 is fastened in the table 3 while the nut 16 fit into the threaded hole 35 is fastened in the table 4. The nuts 15, 16 have female threads 33, refer to FIG. 5, which are made in reverse directions from each other. The lead screw 5 has male threads of right-handed thread and left-handed thread which are made adjacent in lengthwise direction to fit into both the nuts 15 and 16.

Figure 8:
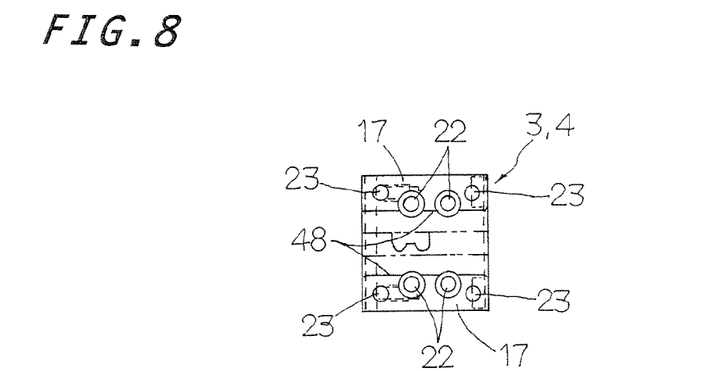
FIG. 8 is a plan view showing one of tables in the small-sized opening/closing slider according to the present invention.
Figure 9:
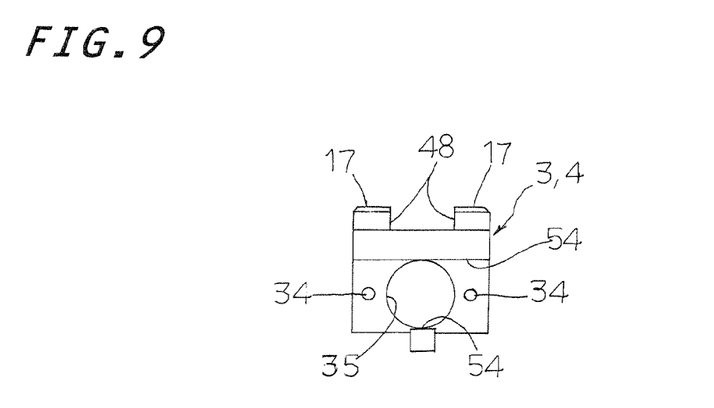
FIG. 9 is a view in side elevation of the table of FIG. 8.
Figure 10:
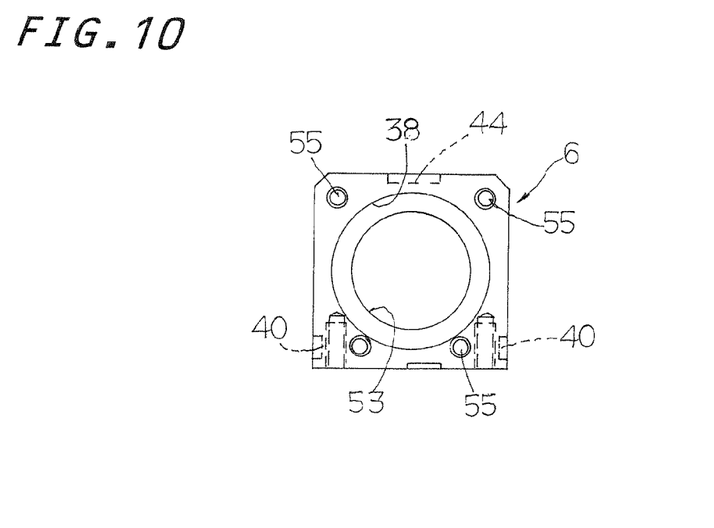
FIG. 10 is a view in side elevation showing a bearing house in the small-sized opening/closing slider according to the present invention.
Figure 11:
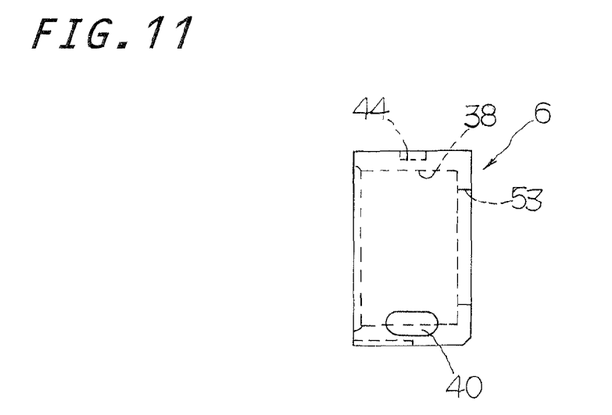
FIG. 11 is a view in front elevation of the bearing house of FIG. 10.
Figure 12:
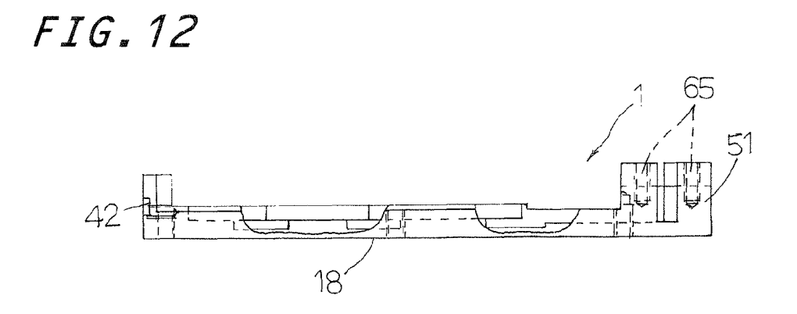
FIG. 12 is a view in side elevation of bed in the small-sized opening/closing slider of the present invention.

With the small-sized opening/closing slider constructed as described above, the tables 3, 4 as shown in FIG. 8 are each provided on a tap surface thereof with a groove 48 extended in a lengthwise direction and flanked with mounting surfaces 17 which are to mount parts including works and so on thereon. On the mounting surfaces 17, there are provided threaded holes 23 and holes 22 used to fasten the works. The tables 3, 4 each have a lengthwise recess 48 flanked or defined with the mounting surface 17 while covering member 10 has an elongated bridge 47 flanked or defined with lengthwise openings 46. After the elongated bridge 47 has fit into the lengthwise recess 48 of the tables 3, 4, the mounting surfaces 17 are allowed to rise into the lengthwise openings 46 to make back-and-forth movement along the lengthwise openings 46. On end surfaces of the tables 3, 4, there are provided recesses 54 to fit over flanged mounting parts 50 of the nuts 15, 16, and the recesses 54 have bores 35 to fit over securely the nuts 15, 16. Moreover, the flanged mounting parts 50 have fastening holes 35 which are used to secure the nuts 15, 16 to the tables 3, 4. In order to fasten the nuts 15, 16 to the tables 3, 4, the flanged mounting parts 50 of the nuts 15, 16 are installed in the recesses 54 and then fastening bolts 27 after extended through holes 32 are driven into threaded holes 34. With the small-sized opening/closing slider of the present invention, the back-and-forth movement of the tables 3, 4 is driven by the motor 2 and controlled through a sensor including a sensor cord 24, resolver cord 25, motor cord 26, and so on.

Figure 13:
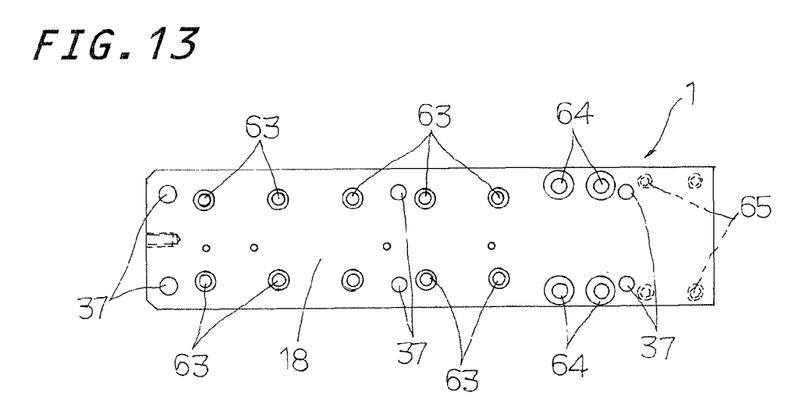
FIG. 13 is a view in bottom elevation of the bed of FIG. 12.

The bed 1 as shown in FIG. 13 has a recess 28 to stow a sensor substrate, the recess 28 lying across a moving range of the tables 3, 4. The bed 1 has fastening holes 63 which are made spaced each other along lengthwise side edges of the bed 1. A pair of track rails 13R is fastened to the bed 1 by means of screws, not shown, driven into the fastening holes 63. On one of the track rails 13R, a slider 13S secured to the table 3 and a slider 14S secured to the table 4 are arranged for sliding movement each other. In other words, a pair of linear motion guide units 13, 14 is arranged on the bed 1. The linear motion guide unit 13 is composed of the guide rail 13R and the slider 13S which slides over the guide rail 13R and the linear motion guide unit 14 is composed of the guide rail 13R and the slider 14S which slides over the guide rail 13R. Moreover, the bed 1 has holes 64 which are used to fasten the bearing house 6 to the bed 1 by means of screws, not shown, driven into the holes 64. The bearing house 6 has therein the bearing 7 consisting of a pair of the angular-contact bearings. The bearing 7 includes therein an inner ring 30, an outer ring 21 and balls 62 interposed between the inner ring 30 and the outer ring 21. The bed 1 at one of lengthwise opposite ends thereof has a lug 51 having threaded holes 65. The coupling member 8 is attached to the lug 51 with screws, not shown, which are driven into the threaded holes 65. The coupling member 8 at one end thereof fits into a bore 53 in the bearing house 6. Accordingly, the bed 1 the bed 1 has mounted thereon the guide rails 13R, bearing house 6 and the coupling member 8 by means of screws, respectively.

With the small-sized opening/closing slider constructed as described above, especially, the lead screw 5 has the right-handed screw and the left-handed screw lying adjacent to each other in the lengthwise direction of the lead screw 5. The tables 3, 4 mounted to the nuts 15, 16 mating with the right-handed thread and the left-handed thread are allowed to make back-and-forth movement in reverse directions each other as the lead screw turns on its own axis, thereby coming closer and/or away from each other. More especially, any one of the right-handed screw and the left-handed screw on the lead screw 5 mated with the nut 15 has the threads 11 larger in diameter and another of the right-handed screw and the left-handed screw mated with the nut 16 has the threads 12 smaller in diameter. The shaft end 56 nearer to the motor 2 is made with the threads 11 larger in diameter and the reduced shaft opposite the motor 2 has the threads 12 smaller in diameter. The nut 15 mating with the larger threads 11 is designed to fit over the smaller threads 12. With the lead screw 5, moreover, a stepped portion or flange 20 coming into abutment or engagement with the inner ring 30 of the bearing 7 is formed on the shaft end 56 continuing to a zone having the larger threads 11 thereon. More especially, the lead screw 5 has the threads 11 of larger diameter on the side of the motor 2 and the threads 12 of smaller diameter on side opposite to the motor 2. Moreover, a retainer plate 39 is arranged circumferentially around the flange 20 in adjacency with the outer ring 21 of the angular-contact bearing 7 to stow the angular-contact bearing 7 in the bearing house 6. The retainer plate 39 is fastened to outside circumference of the bearing house 6 by means of the screws, not shown, which are driven into threaded holes 55 formed in the bearing house 6. With the small-sized opening/closing slider constructed as described above, as the lead screw 5 rotates after energization of the motor 2, the tables 3, 4 start to move in directions opposite to each other. When the motor 2 rotates in any one direction, the tables 3, 4 are actuated to come closer each other. When the motor 2 rotates in a direction opposite to the above direction, the tables 3, 4 are actuated to space away from each other.

With the small-sized opening/closing slider of the present invention, the moor 2 is fastened to the bed 1 through a bracket 9. An output shaft 49 of the motor 2 supported with a motor bracket 9 having vibration-resistant property. The small-sized opening/closing slider of the present invention features that a pair of the tables 3, 4 after energization of the motor 2 is controlled to come to a preselected phase in which the tables 3, 4 get closer or nearer each other or come to another preselected phase in which the tables 3, 4 go away from each other. With the small-sized opening/closing slider constructed as stated earlier, accordingly, gripping members such as fingers and so on attached to the tables 3, 4 after the tables 3, 4 have got closer or nearer each other will come to a closing position where the fingers and so on grip the works between them. The gripping members on the tables 3, 4 after the tables 3, 4 have got away each other will come to an opening position where the fingers and so on release the works from them.

The lead screw 5 has the zones of the larger thread 11 of right-handed or left-handed thread larger in diameter and other zones of the smaller thread 12 of right-handed or left-handed thread larger in diameter. The larger threads 11 and the smaller threads 12 are equal in pitch with each other. When the small-sized opening/closing slider constructed as stated earlier is applied to the chucks to grip any parts including the works and so on, the tables 3, 4 or fingers move preferably at constant velocity so as not to have adverse influence such as any impact on the parts including the works and so on. With the lead screw 5, the flange 20 continuing the shaft end 56 is made larger in diameter than the large screw 11 to define an end surface 57 which comes into abutment against the inner ring 30 of the bearing 7. The coupling member 8 at an axial end thereof, after having fit into the bore 53 in the bearing house 6, comes into abutment against the inner ring 30 of the bearing 7. More especially, the inner ring 30 of the bearing 7 lies between the stepped portion of the lead screw 5 or the end surface 57 of the flange 20 and an end surface 58 of the coupling member 8 to bear the lead screw 5 against the bearing 7. Moreover, the lead screw 5 is constituted in either of the sliding screw construction in which a pair of nuts 3, 4 mates directly with the lead screw 5 and the ball screw construction in which a pair of nuts 3, 4 mates with the lead screw 5 through balls, not shown, installed between the nuts 3, 4 and the lead screw 5. With the lead screw 5 constituted in the ball screw construction as stated earlier just above, the large screw 11 of M6 (outer diameter of 6 mm) and the small screw 12 of M4 (outer diameter of 4 mm) are preferred to make the opening/closing slider itself smaller.

With the small-sized opening/closing slider of the present invention, the linear motion guide units 13, 14 to get sliding the tables 3, 4 is shrouded with a covering member 10 to extrude dust and dirt. The covering member 10 is defined with widthwise opposite sides 59, an end side 61 and an upper side 60 to open on a bottom side and other end side lying on the side of the motor 2. On the upper side 60, the bridge member 47 is flanked with lengthwise openings 46 to fit over the mounting surfaces 17 of the tables 3, 4. The covering member 10 has lugs 41 raised above the inside surfaces of the opposite sides 59, a lug 43 lying above the inside surface of the end side 61 and a lug 45 lying above the inside surface of the upper side 60. In contrast, the bed 1 on an end opposite to the motor 2 has a recess 42 to fit over the lug 43 on the covering member 10. The bearing house 6 on sidewise opposite sides thereof has recesses 40 to fit over or make engagement with the lugs 41 on the covering member 10, and a recess 44 to fit over or make engagement with the lugs 45 on the covering member 10. Thus, the covering member 10 is placed on the bed 1 in a way the covering member 10 enshrouds the tables 3, 4 on the bed 1 through the end side and the bottom thereof. Thereafter, the lugs on the covering member 10 are snap-fit with the corresponding recesses 40 to 44 to fasten the covering member 10 to the bed 1.

With the small-sized opening/closing slider constructed as stated earlier, the design specification of the tables 3, 4, bed 1, lead screw 5 and so on, for example, is defined as stated below. The tables 3, 4 had the width of 15 mm. The bed 1 having mounted the tables 3, 4 thereon has the width of 15 mm. Thus, opening/closing slider with the covering member 10 has the overall height of 20 mm and the width of around 17 mm. The tables 3, 4 mounted to the linear motion guide units 13, 14 were allowed to make back-and-forth movement on the guide rail 13R over a stroke across 5 mm and, therefore, the tables 3, 4 were allowed to move across 10 mm for closing and/or opening operation. Moreover, the larger screws and the smaller screws were made with the screw specifications as stated later. The lead screw 5 had the smaller screw having M4 (outside diameter of 4 mm) and pitch or lead of 1 mm. The larger screw had M5 (outside diameter of 5 mm) and pitch or lead of 1 mm. The lead screw 5 had the overall length of 54 mm, in which the right-handed screw is 18.5 mm in length and the left-handed screw is 19.5 mm.

What is claimed is:

1. An opening/closing slider, comprising:
    an elongated bed having a mounting surface of a rectangular shape in a plane surface;
    a pair of tables allowed to move in a sliding manner lengthwise of the elongated bed through a linear motion guide unit, the pair of tables each having a top surface to mount a workpiece thereon;
    a lead screw supported for rotation on the elongated bed to extend in a lengthwise direction of the elongated bed, the lead screw being mated with a pair of nuts, each nut fastened to one of the pair of tables;
    a bearing house fastened to the elongated bed to bear an axial end of the lead screw through a bearing; and
    a motor driving the lead screw through a coupling member which connects an output shaft of the motor and a terminal end of the axial end of the lead screw;
    wherein the lead screw comprises a first screw portion and a second screw portion, wherein the first screw portion is larger in diameter than the second screw portion and closer to the motor than the second screw portion, wherein one of the first and second screw portions include right-handed threads mating with one of the pair of nuts, and wherein the other of the first and second screw portions include left-handed threads mating with the other of the pair of nuts, and wherein the right-handed threads and the left-handed threads are adjacent to each other in the lengthwise direction of the lead screw; and
    wherein a stepped portion or flange is formed on an axial end of the lead screw extending to the first screw portion, wherein the stepped portion or flange abuts or engages an inner ring of the bearing, and whereby, after energization of the motor, the pair of tables are controlled to come to a preselected phase in which the pair of tables move closer or nearer each other or come to another preselected phase in which the pair of tables move away from each other.

2. The opening/closing slider of claim 1, wherein each of the pair of nuts are installed in a bore axially extending through each of the pair of tables and fastened to each of the pair of tables through a mounting part which is set on an end surface of each of the pair of nuts and wherein the nut mating with the first screw portion is formed to fit over the second screw portion.

3. The opening/closing slider of claim 1, wherein the threads of the first and second screw portions are equal in pitch.

4. The opening/closing slider of claim 1, wherein the bearing supporting the lead screw comprises a pair of angular-contact bearings, which are set in place and fastened to the lead screw by means of the stepped portion or flange and the coupling member.

5. The opening/closing slider of claim 1, wherein the flange on the lead screw is larger in diameter than the first screw portion, and the nut fastened to the first screw portion is controlled on the lead screw.

6. The opening/closing slider of claim 1, wherein lead screw is supported by the bearing, the inner ring of the bearing being interposed between an end surface of the stepped portion or the flange and an end surface of the coupling member.

7. The opening/closing slider of claim 1, wherein the lead screw is either a sliding screw or a ball screw, and wherein the pair of nuts mates with the lead screw through balls.

8. The opening/closing slider of claim 7, wherein an outer diameter of the first screw portion is 6 mm, and an outer diameter of the second screw portion is 4 mm.

9. The opening/closing slider of claim 1, wherein the linear motion guide units are shrouded with a covering member including lugs to exclude dust and dirt wherein the covering member has lugs;
    wherein the elongated bed includes a recess disposed within an end opposite to the motor, and the bearing house includes recesses disposed within lateral sides thereof;
    wherein the recesses are configured snap-fit over or make snap-engagement with the lugs on the covering member to fasten the covering member to the elongated bed.

* * * * *